United States Patent
Chen et al.

(10) Patent No.: US 8,954,510 B2
(45) Date of Patent: Feb. 10, 2015

(54) PARSING EMAILS

(75) Inventors: Yen-Fu Chen, Austin, TX (US); John H. Handy-Bosma, Cedar Park, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1610 days.

(21) Appl. No.: 11/189,934

(22) Filed: Jul. 26, 2005

(65) Prior Publication Data

US 2007/0027954 A1   Feb. 1, 2007

(51) Int. Cl.
*G06F 15/16* (2006.01)
*H04L 12/58* (2006.01)
*G06Q 10/10* (2012.01)

(52) U.S. Cl.
CPC ............. *H04L 12/58* (2013.01); *H04L 51/08* (2013.01); *G06Q 10/107* (2013.01)
USPC .......................................... 709/206; 709/207

(58) Field of Classification Search
USPC ................................. 709/204–207
See application file for complete search history.

(56) References Cited

U.S. PATENT DOCUMENTS

| | | | |
|---|---|---|---|
| 5,818,447 A | 10/1998 | Wolf et al. | |
| 5,873,023 A | 2/1999 | Phillips et al. | |
| 5,963,948 A | 10/1999 | Shilcrat | |
| 6,385,641 B1 | 5/2002 | Jiang et al. | |
| 6,711,608 B1 | 3/2004 | Ogilvie | |
| 6,711,609 B2 | 3/2004 | Boyer et al. | |
| 6,757,713 B1 | 6/2004 | Ogilvie et al. | |
| 7,054,905 B1 * | 5/2006 | Hanna et al. | 709/206 |
| 7,222,299 B1 * | 5/2007 | Lim et al. | 715/273 |
| 7,315,880 B2 * | 1/2008 | Chang et al. | 709/203 |
| 2001/0030960 A1 | 10/2001 | Nakada et al. | |
| 2002/0099775 A1 | 7/2002 | Gupta et al. | |
| 2003/0009595 A1 * | 1/2003 | Collins | 709/247 |
| 2003/0154294 A1 | 8/2003 | Lin | |
| 2003/0177191 A1 | 9/2003 | Kawashima et al. | |
| 2004/0054737 A1 * | 3/2004 | Daniell | 709/206 |
| 2004/0128357 A1 * | 7/2004 | Giles et al. | 709/206 |
| 2004/0133564 A1 | 7/2004 | Gross et al. | |
| 2004/0221012 A1 * | 11/2004 | Heumesser | 709/206 |
| 2004/0243844 A1 | 12/2004 | Adkins | |
| 2004/0267886 A1 | 12/2004 | Malik | |
| 2005/0108351 A1 * | 5/2005 | Naick et al. | 709/207 |
| 2005/0210115 A1 | 9/2005 | Neito et al. | |
| 2006/0041626 A1 * | 2/2006 | Chen et al. | 709/206 |
| 2006/0143270 A1 * | 6/2006 | Wodtke et al. | 709/206 |
| 2006/0259556 A1 * | 11/2006 | Auhagen | 709/206 |
| 2007/0005716 A1 | 1/2007 | LeVasseur et al. | |
| 2007/0124383 A1 | 5/2007 | Hebert et al. | |

OTHER PUBLICATIONS

Office action for U.S. Appl. No. 11/189,937 dated Sep. 14, 2007.
Office action for U.S. Appl. No. 11/189,937 dated Feb, 5, 2008.
Office action for U.S. Appl. No. 11/189,937 dated Aug. 14, 2008.

* cited by examiner

*Primary Examiner* — Richard G Keehn
(74) *Attorney, Agent, or Firm* — Yee & Associates, P.C.; Lisa J. Ulrich (57) ABSTRACT

A method of parsing an email includes receiving an email and determining whether the email includes a response history. Based on the response history, the email is parsed. A computer usable medium including computer readable code and a system including means for accomplishing similar actions is also disclosed.

8 Claims, 11 Drawing Sheets

```
TO      Person X
FR      Person Y
DA      5/1/05
RE      email
```

Glad to hear it.

```
TO      Person Y
FR      Person X
DA      4/15/05
RE      email
```

Those local sports heroes are doing great this year!

```
TO      Person X
FR      Person Y
DA      4/10/05
RE      email
```

How's the weather?<<Great! How about that sports team?>><They've got a nice win streak, but they always lose in the end.>

```
TO      Person X
FR      Person Y
DA      4/4/05
RE      email
```

How's the weather?<Great! How about that sports team?>

```
TO      Person Y
FR      Person X
DA      4/1/05
RE      email
```

How's the weather?

FIG. 10

PARSING EMAILS

RELATED APPLICATIONS

This application is related to U.S. patent application Ser. No. 11/189,937 (AUS920050465US1) filed concurrently herewith, and the entirety of that application is incorporated herein by reference.

FIELD OF INVENTION

The present invention generally relates to emails. More specifically, the invention relates to parsing emails.

BACKGROUND OF THE INVENTION

Electronic communications using email are a popular method of communication between users. Many users of email send and receive megabytes worth of email on a daily basis—a fact that can strain network bandwidth, as well as storage facilities.

Exacerbating the difficulties inherent in facilitating email communication is email history, especially multiple levels of history. Many email programs either automatically or by virtue of a user's setting automatically include all history in a current email chain. In an extensive chain of emails, including forwarded emails and replies, an individual email can quickly require significant bandwidth and storage for aged or dated information.

Manually deleting history can reduce this problem, but many users either do not engage in this additional effort, or do not worry about any strain on the network. Further, many users do not perceive any value gained by pruning history, and others simply do not grasp how sizable an email becomes after multiple responses. Similarly, a strict bar on including history can have unintentional and undesired effects, including potentially stifling communication while adding to a user's workload.

A technology that can identify the history within an email would assist in obtaining improved system performance.

As used throughout this disclosure, the term 'levels', as applied to discussing levels of email history, means at least a portion of a discrete response that was previously sent by one user of an email system to at least one other user of the email system. An email can contain no levels of response history, or any number of levels. The 'first level' of response history is the first response to an originating email—an email that is not a reply or forward. Similarly, the 'second level' of response history is a response or forward of the first level.

It is therefore a challenge to develop a method to parse emails to overcome these, and other, disadvantages.

SUMMARY OF THE INVENTION

A first embodiment of the present invention is a method for parsing emails including receiving an email and determining whether the email includes a response history. The email is then parsed based on the response history.

A second embodiment of the present invention is a computer usable medium including computer readable code for parsing emails including computer readable code for receiving an email and computer readable code for determining whether the email includes a response history. The medium further includes computer readable code for parsing the email based on the response history.

A third embodiment of the present invention is a system for parsing emails including means for receiving an email and means for determining whether the email includes a response history. The system further includes means for parsing the email based on the response history.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
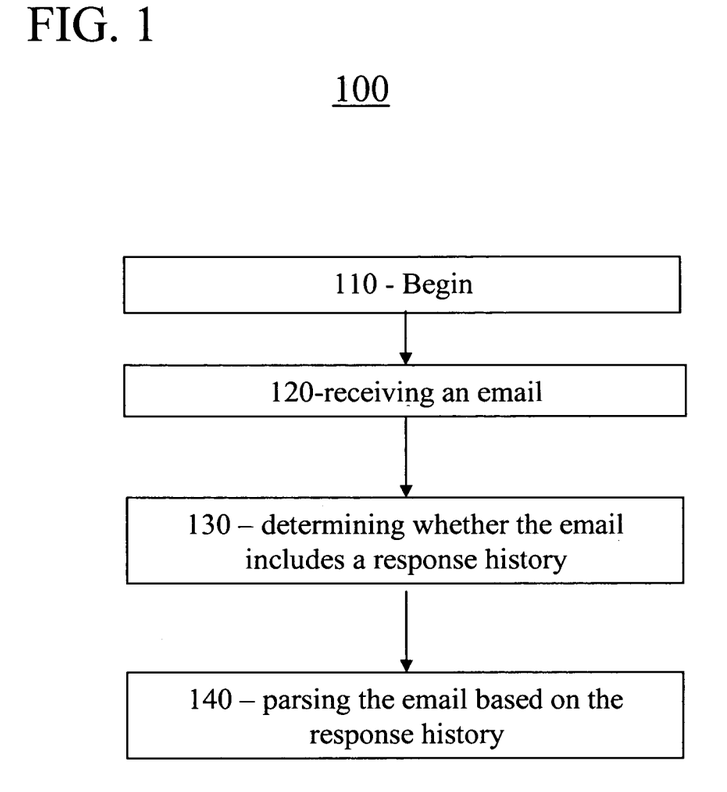
FIG. 1 illustrates one embodiment of a method for parsing email in accordance with one aspect of the invention.

FIG. 1 illustrates one embodiment of a method 100 for parsing email in accordance with one aspect of the invention. Method 100 begins at step 110. Any of the inventive methods disclosed herein may be performed in any order, and the order in which the method steps are described does not limit the order in which the steps can be performed.

Method 100 continues at step 120 by receiving an email. In one embodiment, the email is received at a personal computer. In another embodiment, the email is received at a mail server, either prior to delivery to at least one recipient, or prior to receipt by at least one recipient. In one embodiment, the email is received by method 100 prior to transmission from a user's personal computer as a result of a 'send' command. In another embodiment, the email is received by a server prior to transmission over a network but after a user submits a 'send' command. In another embodiment, the email is received from a public network of computers, such as the Internet, for transmission to a user via a local, or private, network.

Figure 1A:
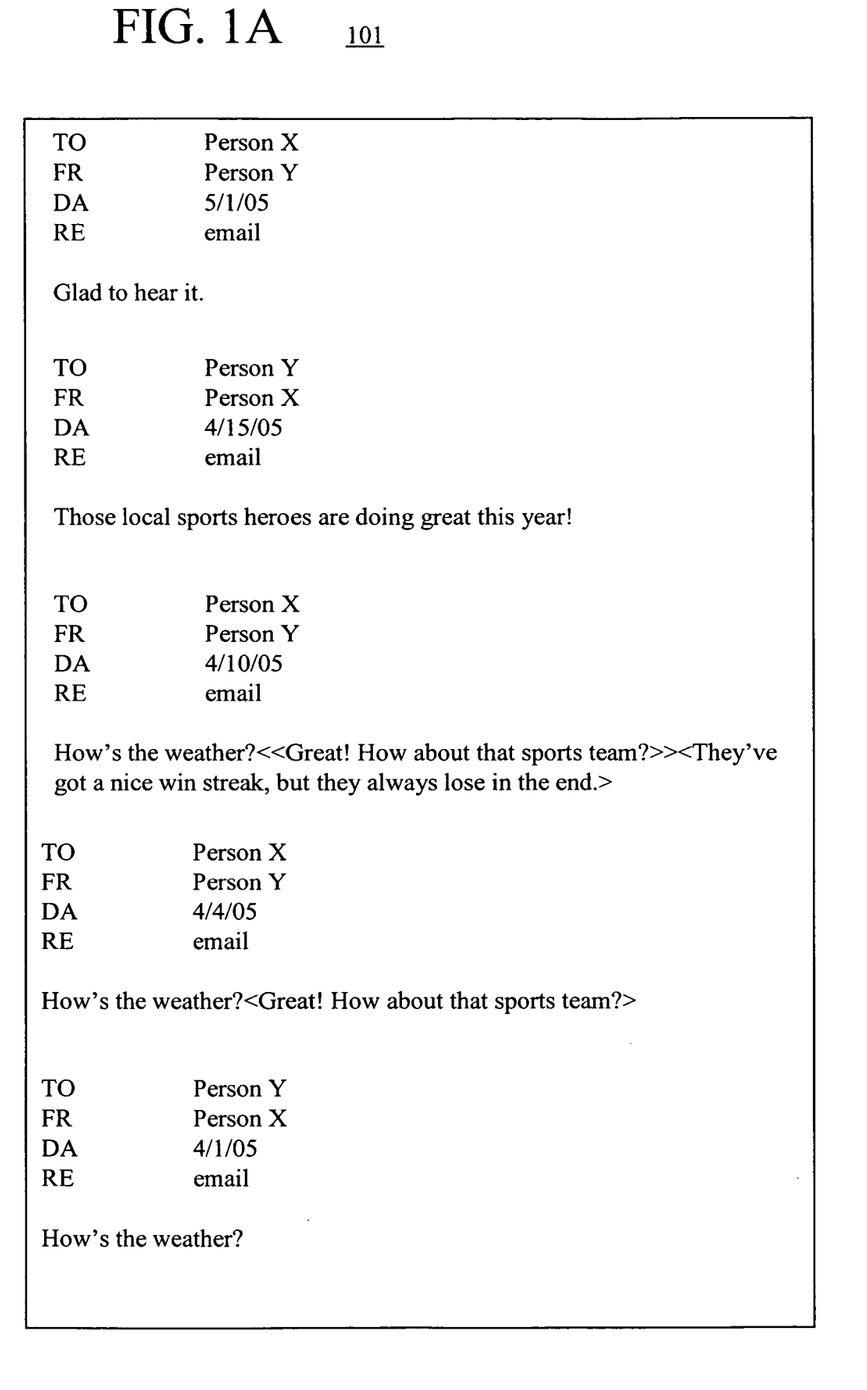
FIG. 1A illustrates an example of an email including response history.

Having received an email, method 100 determines whether the email includes a response history at step 120. Determining whether the email includes a response history includes examining the email for factors or markers that indicate that the email includes at least one section of response history. In one embodiment, method 100 determines whether an email header includes information sufficient to identify the response history. FIG. 1A illustrates an exemplary email including a main email, an email with response history, an email with two levels of embedded response history, and an email with one level of response history at 101. As shown, the emails are in reverse order of send date, with the most recent email listed first.

Additionally, determining whether the email includes a response history at step 120 can include a number of additional steps, examples of which are as described more fully below.

The email is parsed based on the response history at step 130. Parsing the email based on response history identifies, and in some embodiments, labels and/or marks, each section of response history contained within the email.

Figure 2:
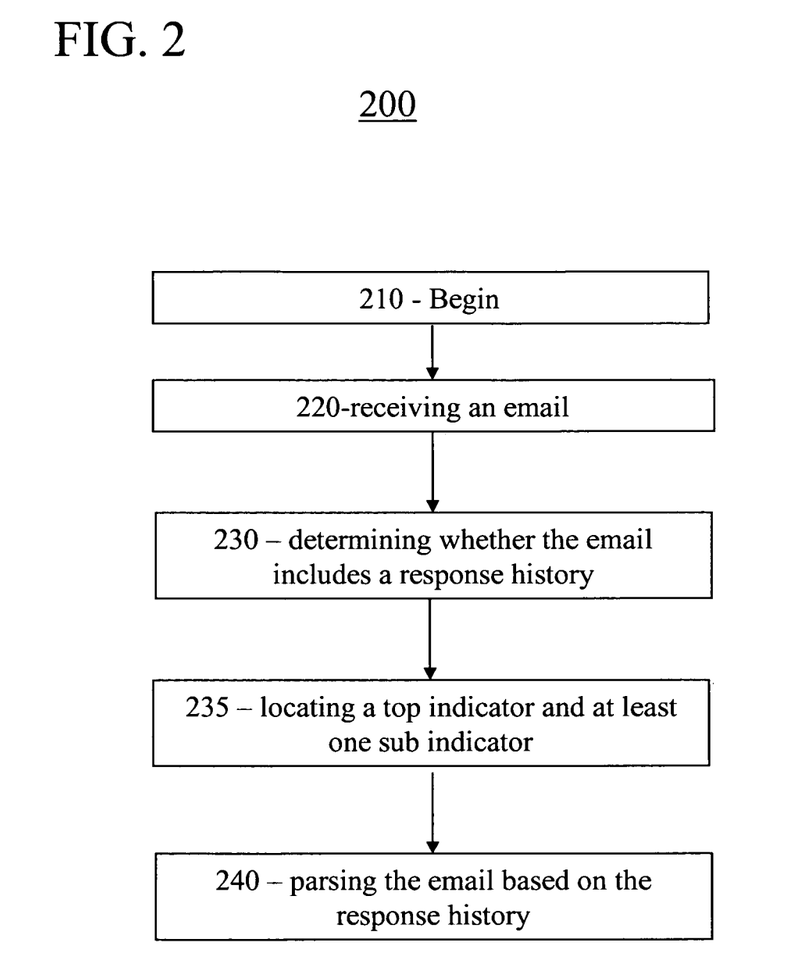
FIG. 2 illustrates another embodiment of a method for parsing email in accordance with one aspect of the invention.

FIG. 2 illustrates another embodiment of a method 200 for parsing email in accordance with one aspect of the invention. Method 200 begins at step 210. An email is received at step 220. In one embodiment, step 220 is implemented as in step 120. Method 200 determines whether the email includes a response history at step 230. In one embodiment, step 230 is implemented as in step 130.

In method 200, determining whether the email includes a response history is also implemented by locating a top indicator, and at least one sub indicator. An 'indicator' is any indication, such as a code, format, tag, or the like, within the email body or the email header that at least a portion of the email includes a response history. A 'top' indicator is the first indicator located in an email as viewed from the top down. A 'sub' indicator is any indicator that follows the top indicator.

At step 240, method 200 parses the email based on the determined response history. In one embodiment, step 240 is implemented as step 140.

Figure 3:
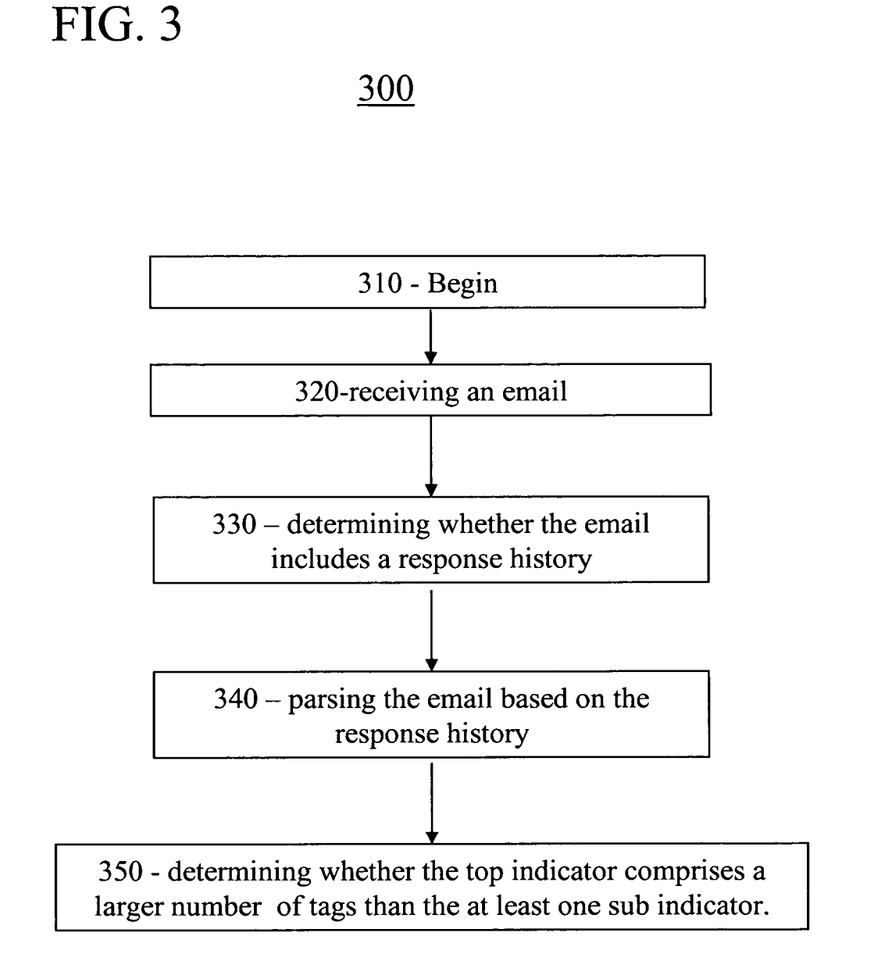
FIG. 3 illustrates another embodiment of a method for parsing email in accordance with one aspect of the invention.

FIG. 3 illustrates another embodiment of a method 300 for parsing email in accordance with one aspect of the invention. Method 300 begins at step 310. An email is received at step 320. In one embodiment, step 320 is implemented as in step 120. Method 300 determines whether the email includes a response history at step 330. In one embodiment, step 330 is implemented as in step 130. At step 340, method 300 parses the email based on the determined response history. In one embodiment, step 340 is implemented as step 140.

At step 350, method 300 determines whether the top indicator comprises a larger number of indicators than the at least one sub indicator. If the top indicator comprises a larger number of indicators than at least one sub indicator, such a fact indicates that the email includes more than one level of response history. Since many emails include a specific indicator, such as a tag or a non-alphanumeric code (such as '<' or '|' or '%' or '#') to indicate that a particular block of data is a particular level of response history, the number of indicators can support a determination of response history level. Additionally, the number of specific indicators can indicate the level of response history. For example, a single indicator indicates a first level of response history, while 3 sequential indicators indicates a third level of response history.

For example, if reviewing a particular email reveals that the top indicator includes 3 indicators, and the sub indicators include two or fewer indicators, the email can then be sectioned into response histories for further analysis or processing. Such a finding would be indicative that the response history proceeds sequentially, and without embedded responses. Alternatively, if reviewing an email reveals that the top indicator includes 3 indicators while one of the sub indicators includes four indicators, the email includes at least one embedded response. As used herein, an "embedded response" is any communication that has been placed in the body of an earlier response.

In certain embodiments of the invention, the parsed email is further analyzed or processed. For example, the parsed email can be marked, as described in U.S. patent application Ser. No. 11/189,937 (AUS920050465US1). In another example, at least one level of response history is removed from the email as described in U.S. patent application Ser. No. 11/189,937 (AUS920050465US1). Further, other processing, such as spell check or other applications can be executed on the email prior to, during, or after execution of the inventive methods herein.

Figure 4:
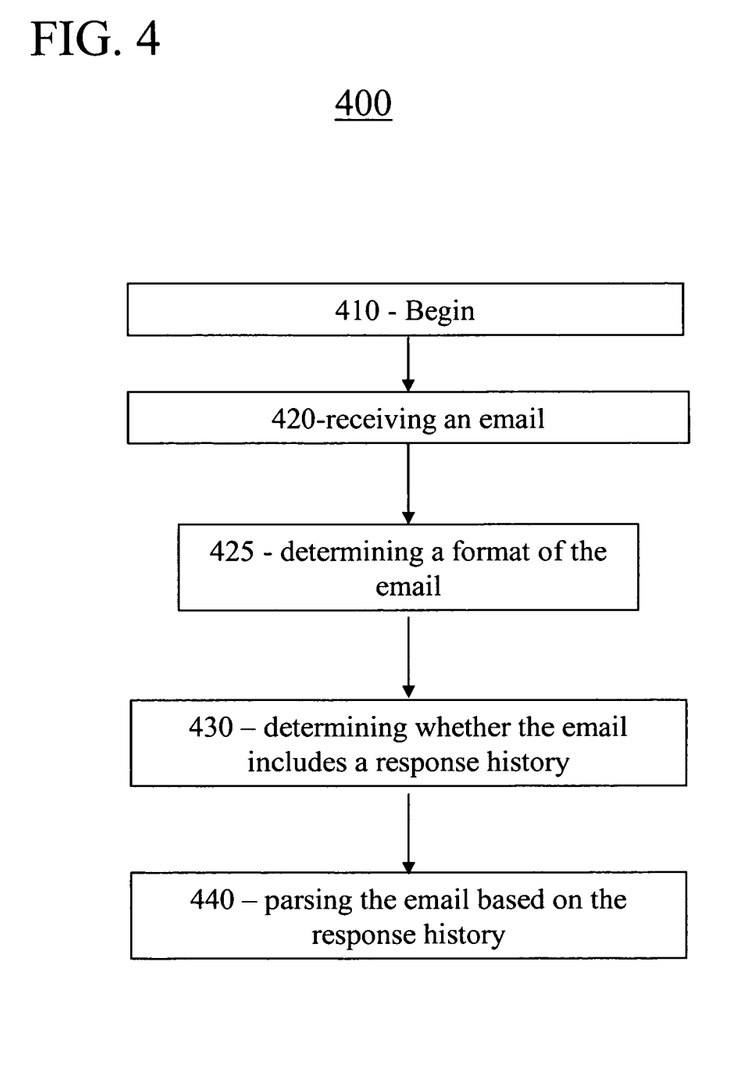
FIG. 4 illustrates another embodiment of a method for parsing email in accordance with one aspect of the invention.

FIG. 4 illustrates another embodiment of a method 400 for parsing email in accordance with one aspect of the invention. Method 400 begins at step 410. An email is received at step 420. In one embodiment, step 420 is implemented as in step 120.

Method 400 determines a format of the received email at step 425. Emails include an identifiable format, often within the header of the email. For example, the format of email can be text. In another embodiment, the email is formatted as HTML, or another markup language, such as XML. In one embodiment, identifying the format assists method 400 to determine what tag information is or can be available to discern an email history.

For example, emails formatted as text often feature a non-alphanumeric character to denote sections of the email that are a response history. In another example, markup language format emails include tags illustrating information, such as response history information, about the email. For example, a markup language format email may include a SPAN class tag including a unique numeric identification indicative of a response history. In another embodiment, a blockquote tag indicates a response history. In yet another embodiment, a bitcount tag, indicative of the number of bits between tags can be used to determine whether information has been embedded since the bitcount was established.

Method 400 determines whether the email includes a response history at step 430. In one embodiment, step 430 is implemented as in step 130. At step 440, method 400 parses the email based on the determined response history. In one embodiment, step 440 is implemented as step 140.

Figure 5:
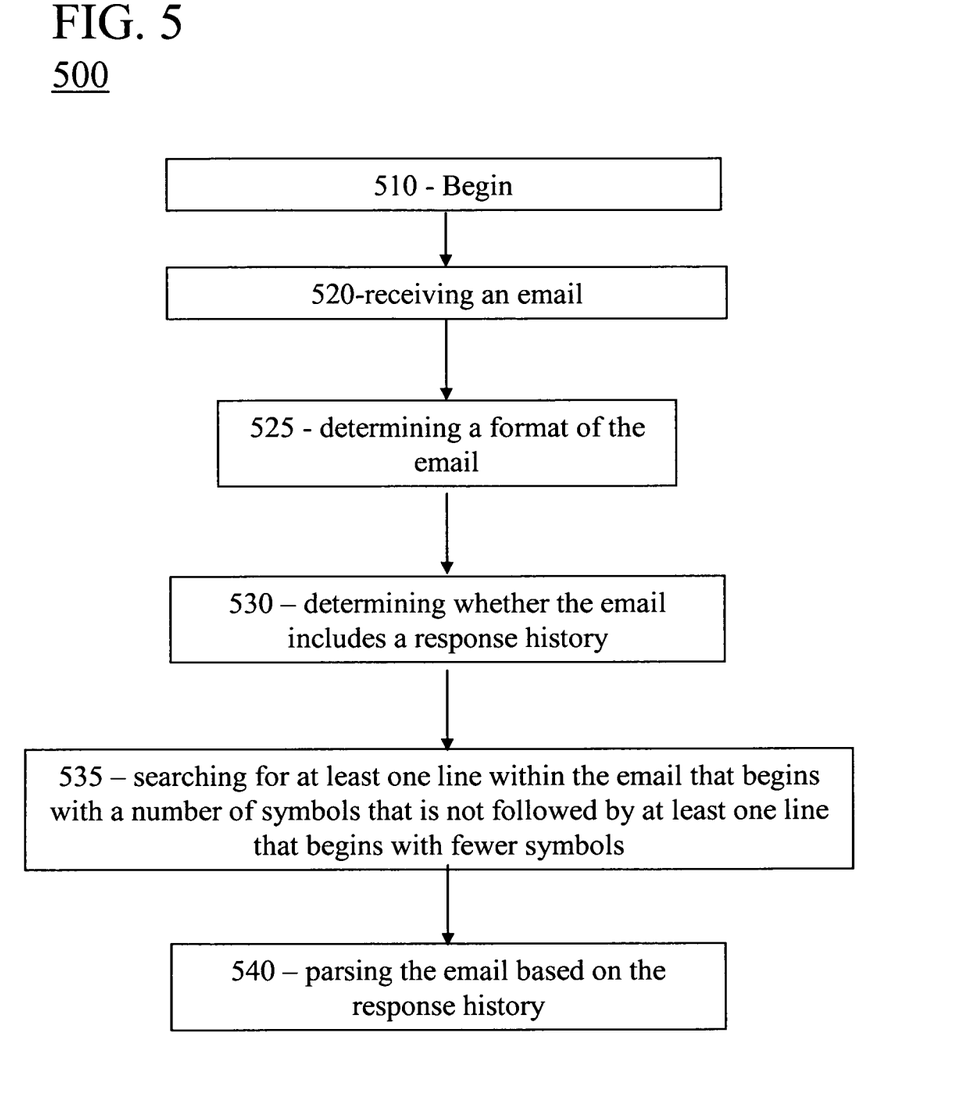
FIG. 5 illustrates another embodiment of a method for parsing email in accordance with one aspect of the invention.

FIG. 5 illustrates another embodiment of a method 500 for parsing email in accordance with one aspect of the invention. Method 500 begins at step 510. An email is received at step 520. In one embodiment, step 520 is implemented as in step 120. A format of the email is determined at step 525. In one embodiment, step 525 is implemented as in step 425. Method 500 determines whether the email includes a response history at step 530. In one embodiment, step 530 is implemented as in step 130.

Method 500 searches for at least one line within the email that begins with a number of symbols that is not followed by at least one line that begins with fewer symbols, based on a determination that the email is a text format email at step 535. In one embodiment, the symbol is a non-alphanumeric symbol, such as '<' or '|'.

At step 540, method 500 parses the email based on the determined response history. In one embodiment, step 540 is implemented as step 140.

Based on a determination, from step 535, that at least one line begins with a number of symbols that is greater than the number of symbols in any line following that line, method 500, in one embodiment, concludes that there is no embedded response in the email following that line with the greatest number of symbols.

Figure 6:
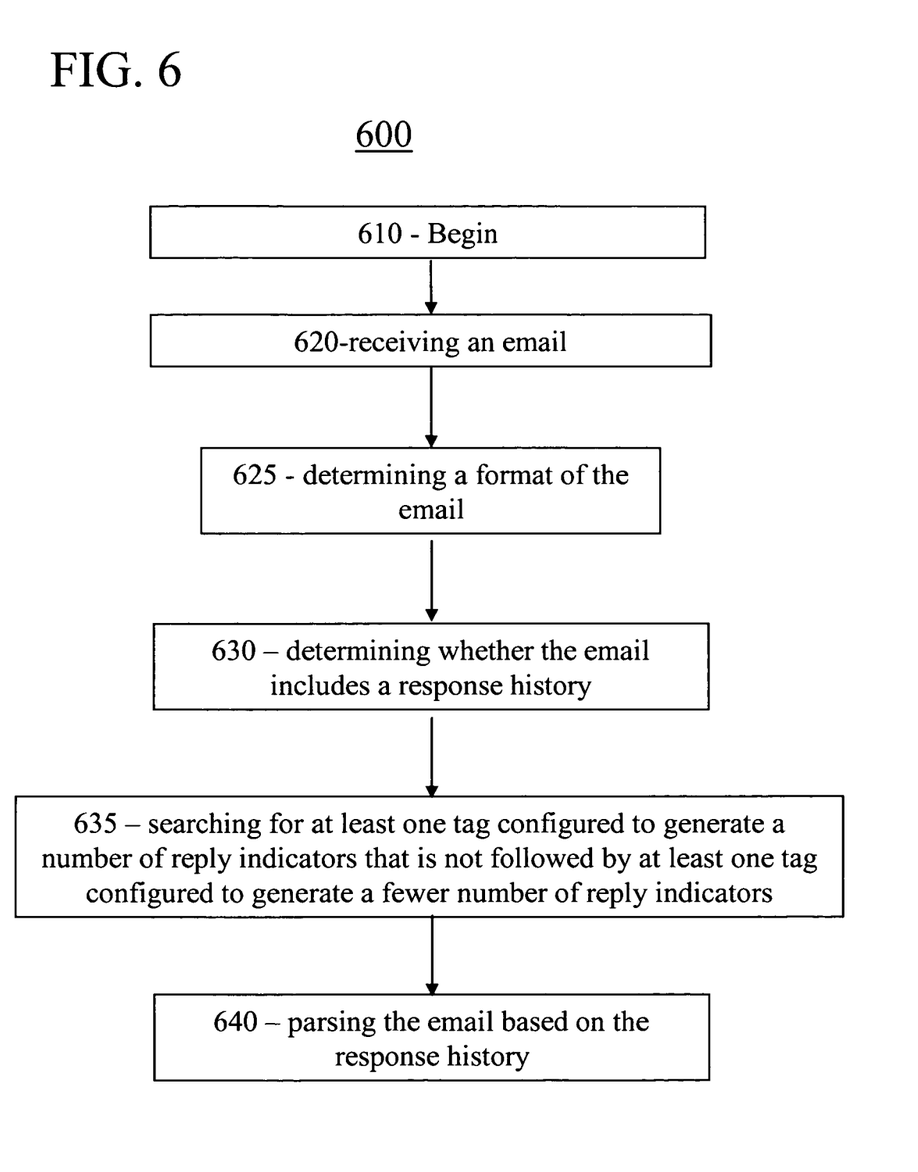
FIG. 6 illustrates another embodiment of a method for parsing email in accordance with one aspect of the invention.

FIG. 6 illustrates another embodiment of a method 600 for parsing email in accordance with one aspect of the invention. Method 600 begins at step 610. An email is received at step

620. In one embodiment, step 620 is implemented as in step 120. A format of the email is determined at step 625. In one embodiment, step 625 is implemented as in step 425. Method 600 determines whether the email includes a response history at step 630. In one embodiment, step 630 is implemented as in step 130.

Method 600 searches for at least one tag configured to generate a number of reply indicators that is not followed by at least one tag configured to generate a fewer number of reply indicators, based on a determination that the email is a markup language format email at step 635. In one embodiment, the tag is a non-alphanumeric symbol, such as '<' or '|'. In other embodiments, the tag is a blockquote tag. In another embodiment, the tag is a SPAN class tag.

At step 640, method 600 parses the email based on the determined response history. In one embodiment, step 640 is implemented as step 140.

Based on a determination, from step 635, that at least one tag is generated to generate a number of reply indicators that is greater than the number of reply indicators generated by any tag following that tag, method 600, in one embodiment, concludes that there is no embedded response in the email following that tag.

Figure 7:
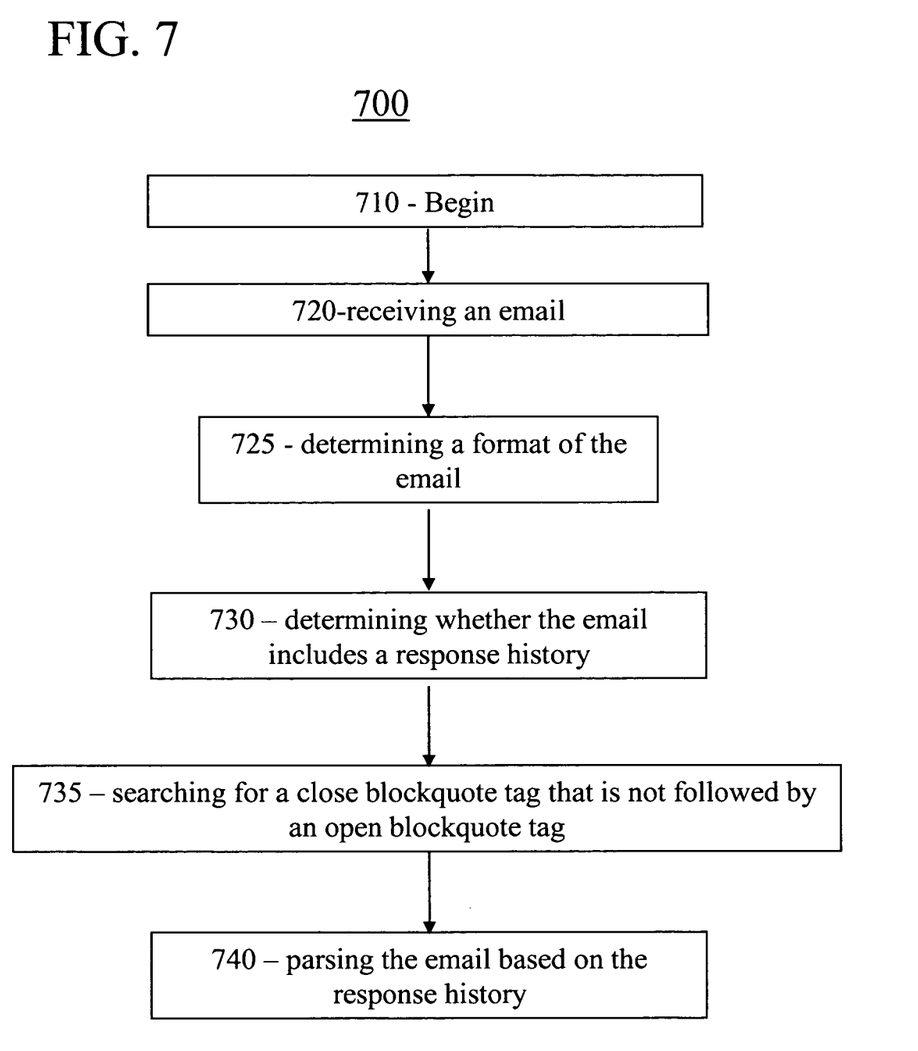
FIG. 7 illustrates another embodiment of a method for parsing email in accordance with one aspect of the invention.

FIG. 7 illustrates another embodiment of a method 700 for parsing email in accordance with one aspect of the invention. Method 700 begins at step 710. An email is received at step 720. In one embodiment, step 720 is implemented as in step 120. A format of the email is determined at step 725. In one embodiment, step 725 is implemented as in step 425. Method 700 determines whether the email includes a response history at step 730. In one embodiment, step 730 is implemented as in step 130.

Method 700 searches for at least one close blockquote tag that is not followed by at least one open blockquote tag, based on a determination that the email is a markup language format email at step 735.

At step 740, method 700 parses the email based on the determined response history. In one embodiment, step 740 is implemented as step 140.

Based on a determination, from step 735, that at least one close blockquote tag is not followed by an open blockquote tag, method 700, in one embodiment, concludes that there is no embedded response in the email following that tag.

Figure 8:
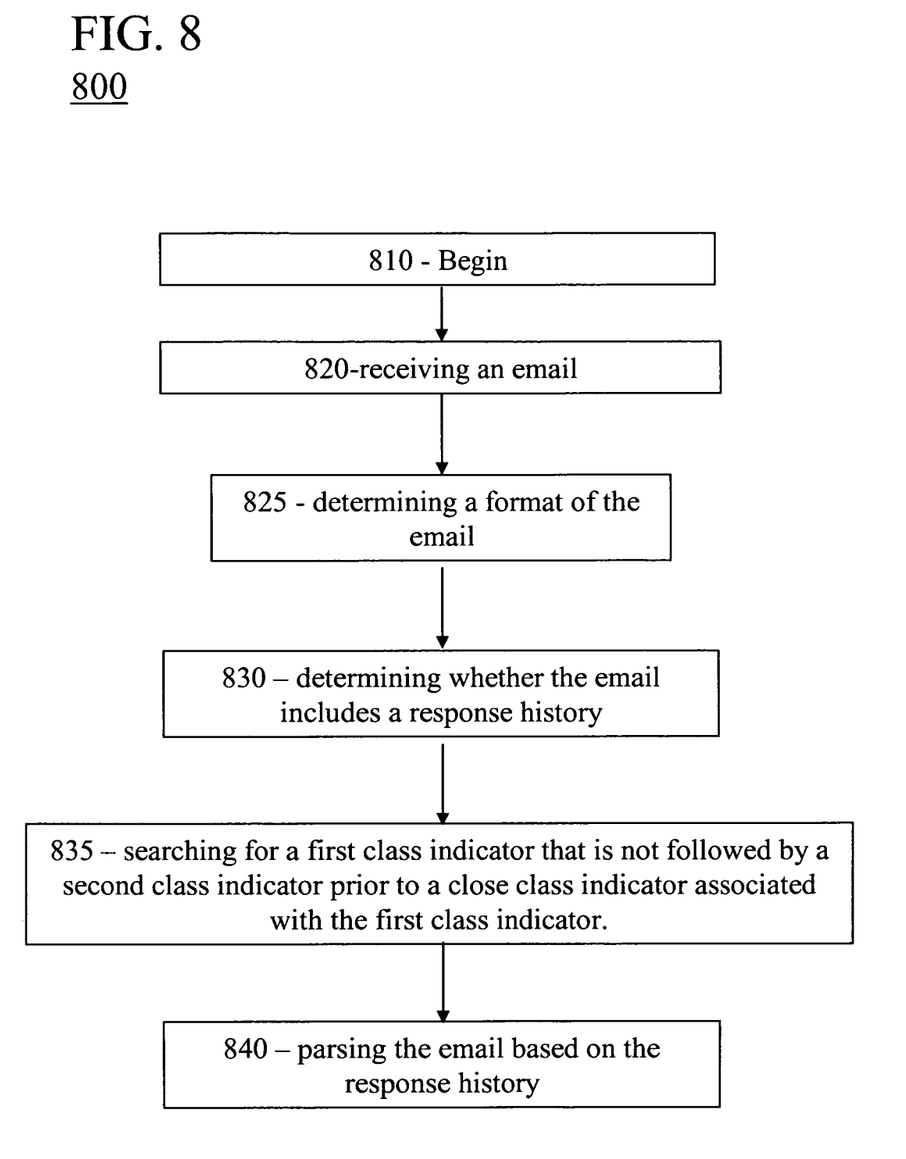
FIG. 8 illustrates another embodiment of a method for parsing email in accordance with one aspect of the invention.

FIG. 8 illustrates another embodiment of a method 800 for parsing email in accordance with one aspect of the invention. Method 800 begins at step 810. An email is received at step 820. In one embodiment, step 820 is implemented as in step 120. A format of the email is determined at step 825. In one embodiment, step 825 is implemented as in step 425. Method 800 determines whether the email includes a response history at step 830. In one embodiment, step 830 is implemented as in step 130.

Method 800 searches for a first class indicator that is not followed by a second class indicator prior to a close class indicator associated with the first class indicator, based on a determination that the email is a markup language format email at step 835.

At step 840, method 800 parses the email based on the determined response history. In one embodiment, step 840 is implemented as step 140.

Based on a determination, from step 835, that the first class indicator is not followed by a second class indicator prior to a close class indicator associated with the first class indicator, method 800, in one embodiment, concludes that there is no embedded response in the email following that tag.

Figure 9:
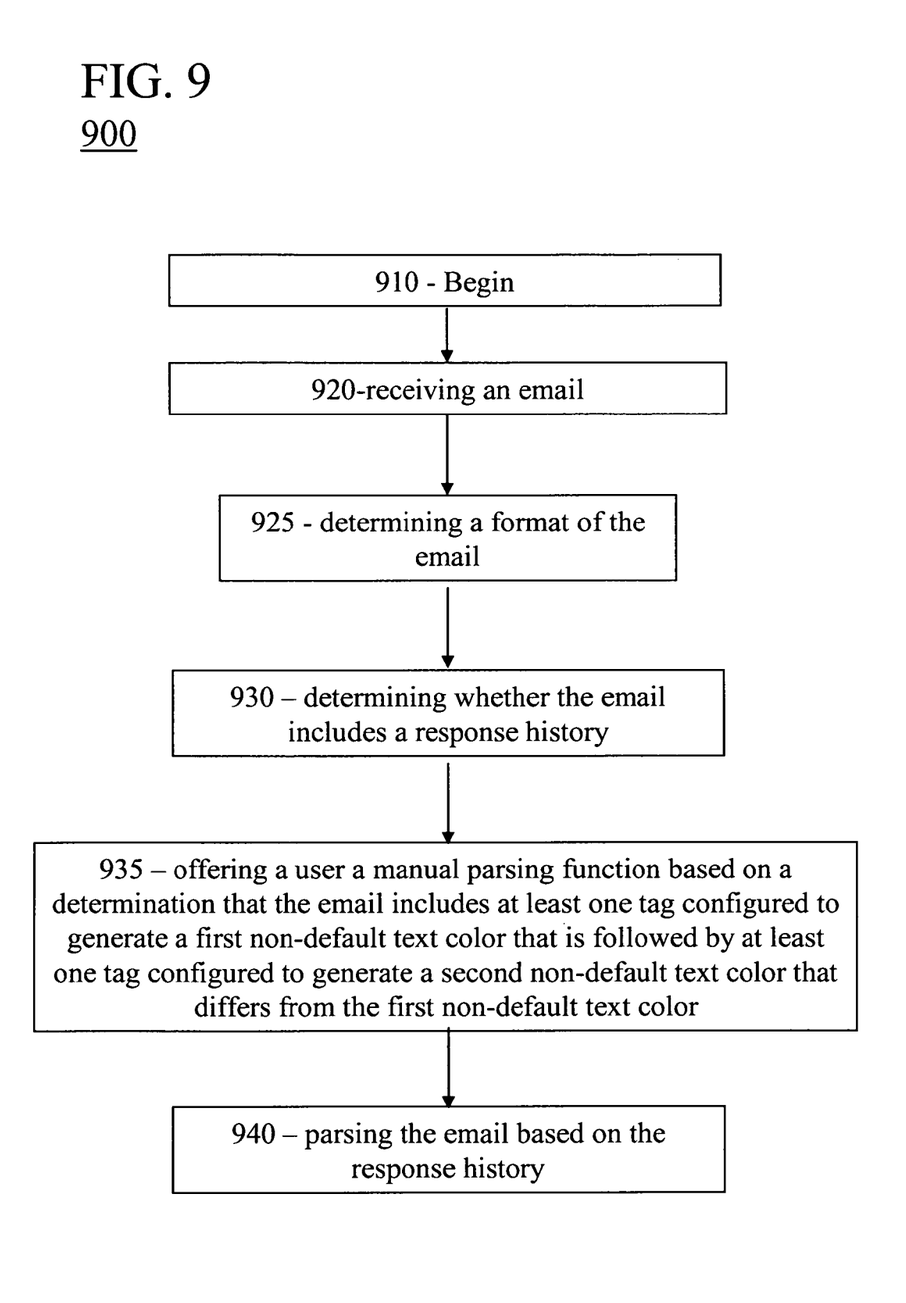
FIG. 9 illustrates another embodiment of a method for parsing email in accordance with one aspect of the invention.

FIG. 9 illustrates another embodiment of a method 900 for parsing email in accordance with one aspect of the invention. Method 900 begins at step 910. An email is received at step 920. In one embodiment, step 920 is implemented as in step 120. A format of the email is determined at step 925. In one embodiment, step 925 is implemented as in step 425. Method 900 determines whether the email includes a response history at step 930. In one embodiment, step 930 is implemented as in step 130.

Method 900 offers a user a manual parsing function based on a determination that the email includes at least one tag configured to generate a first non-default text color that is followed by at least one tag configured to generate a second non-default text color that differs from the first non-default text color that is not followed by a tag configured to generate the first non-default text color, based on a determination that the email is a markup language format email at step 935. A manual parsing function can be implemented using a text based, or GUI, interface, and present the user of an email system with the option to parse the email for response history manually.

At step 940, method 900 parses the email based on the determined response history. In one embodiment, step 940 is implemented as step 140.

Based on a determination, from step 935, that the email includes multiple non-default text colors, method 900, in one embodiment, concludes that it cannot determine the presence of an embedded response, and presents the user with a manual parsing function. In other embodiments, methods in accordance with the invention can present the user with a manual parsing function in response to other determinations relating to the format of the email.

Figure 10:
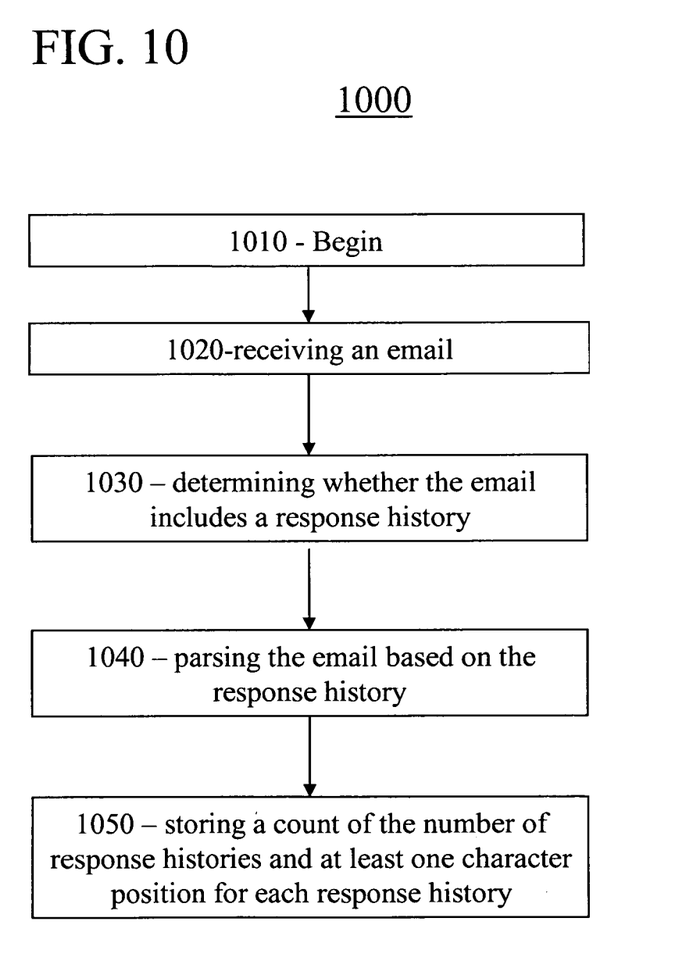
FIG. 10 illustrates another embodiment of a method for parsing email in accordance with another aspect of the invention.

FIG. 10 illustrates another embodiment of a method 1000 for parsing email in accordance with one aspect of the invention. Method 1000 begins at step 1010. An email is received at step 1020. In one embodiment, step 1020 is implemented as in step 120. Method 1000 determines whether the email includes a response history at step 1030. In one embodiment, step 1030 is implemented as in step 130. The email is parsed based on the response history at step 1040.

At step 1050, method 1000 stores the response history in memory that is in electronic communication with the email server. In one embodiment, storing the response history includes storing a count of the number of response histories and at least one character position for each response history. In another embodiment, a bitcount associated with the email is stored. In yet another embodiment, each individual response history is linked, and stored separately. Storing the response history can be implemented substantially simultaneously with the transmission of an email from a user to an email server, or transmission of the email from the email server to a user. In another embodiment, storing the response history is executed on regular or irregular intervals such as with the use of a batch file or as a part of system maintenance. In another embodiment, storing the response history comprises adding a link to the email to link to the stored response history for additional access to the response history.

The teachings and disclosures of this invention can be implemented in any email format. Such formats includes, but are not limited to, POP3, IMAP, MAPI, Lotus Domino, Lotus Notes, and the like.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of managing a string of emails and comments added to the emails by recipients of the emails, the method comprising:
   receiving the string of emails;
   determining that the email is text format, and in response identifying one or more lines within the email that begin with a first number of symbols that is greater than a number of symbols in any subsequent line within the string of emails following the at least one line, each of the symbols indicating that a respective line is part or all of a comment to one of the emails or part or all of one of the string of emails, a lesser number of symbols indicating a more recent comment or email than a greater number of symbols; and
   deleting from the string all emails other than a latest email in the string and substituting respective links to the deleted emails, and deleting the comments in the lines that begin with more symbols than the first number of symbols and substituting respective links to the deleted comments.

2. The computer-implemented method of claim 1, wherein determining whether the email includes a response history comprises offering a user a manual parsing function based on a determination that the email includes a first tag configured to generate a first non-default text color that is followed by a second tag configured to generate a second non-default text color that differs from the first non-default text color.

3. A computer program product for parsing an email, the computer program product comprising:
   a non-transitory computer readable storage device, and computer readable program code stored on the storage device, the computer readable program code comprising:
   computer readable program code to receive the string of emails;
   computer readable program code, to determine that the email is text format, and in response to identify one or more lines within the email that begin with a first number of symbols that is greater than a number of symbols in any subsequent line within the string of emails following the at least one line, each of the symbols indicating that a respective line is part or all of a comment to one of the emails or part or all of one of the string of emails, a lesser number of symbols indicating a more recent comment or email than a greater number of symbols; and
   computer readable code to delete from the string all emails other than a latest email in the string and substituting respective links to the deleted emails, and deleting the comments in the lines that begin with more symbols than the first number of symbols and substituting respective links to the deleted comments.

4. The computer program product of claim 3, wherein computer readable code for determining whether the email includes a response history comprises computer readable code for offering a user a manual parsing function based on a determination that the email includes a first tag configured to generate a first non-default text color that is followed by a second tag configured to generate a second non-default text color that differs from the first non-default text color.

5. A data processing system for parsing an email, the data processing system comprising:
   a bus;
   a memory operably connected to the bus, wherein the memory contains a set of instructions;
   a processor operably connected to the bus, wherein the processor executes the set of instructions to receive the string of emails to determine that the email is text format, and in response to identify one or more lines within the email that begin with a first number of symbols that is greater than a number of symbols in any subsequent line within the string of emails follow the at least one line, each of the symbols indicating that a respective line is part or all of a comment to one of the emails or part or all of one of the string of emails, a lesser number of symbols indicating a more recent comment or email than a greater number of symbols; to delete from the string all emails other than a latest email in the string and substituting respective links to the deleted emails, and deleting the comments in the lines that begin with more symbols than the first number of symbols and substituting respective links to the deleted comments.

6. The data processing system of claim 5, wherein executing the set of instructions to determining whether the email includes a response history comprises the processor executing the set of instructions to offer a user a manual parsing function based on a determination that the email includes a first tag configured to generate a first non-default text color that is followed by a second tag configured to generate a second non-default text color that differs from the first non-default text color.

7. A computer-implemented method of parsing an email, the method comprising:
   receiving an email and determining that the email is markup language format;
   responsive to a determination that the email is markup language format, searching for at least one tag that is contained within the email and is configured to generate a first number of reply indicators that is greater than a second number of reply indicators generated by a subsequent tag that is contained within the email following the at least one tag, the at least one tag indicating of a response history; and
   responsive to a determination that the email includes the indication of the response history, removing the indicated response history from the email, storing the indicated response history, identifying a number of levels of the indicated response history, and inserting into the email links for the respective levels of responses to the responses in the indicated response history.

8. The computer-implemented method of claim 7, wherein determining whether the email includes a response history comprises offering a user a manual parsing function based on a determination that the email includes a first tag configured to generate a first non-default text color that is followed by a second tag configured to generate a second non-default text color that differs from the first non-default text color.

* * * * *